United States Patent Office 3,764,361
Patented Oct. 9, 1973

3,764,361
PHTHALOCYANINES
Jean Andre Paul Kienzle and Michel Ernest Antoine Huille, Creil, and Louis Antoine Cabut, Nogent-sur-Oise, France, assignors to Ugine Kuhlmann, Paris, France
No Drawing. Filed Nov. 22, 1971, Ser. No. 201,196
Claims priority, application France, Nov. 20, 1970, 7041757
Int. Cl. C08h 17/14
U.S. Cl. 106—288 Q
6 Claims

ABSTRACT OF THE DISCLOSURE

Phthalocyanine compounds of the formula:

$$Pc\text{-}[CH_2\text{--}X\text{--}A]_n \qquad (I)$$

in which Pc represents a phthalocyanine residue, X represents an oxygen or sulphur atom, A represents an aryl radical which is unsubstituted or substituted by at least one alkyl group having up to 6 carbon atoms and $n$ represents a whole number from 1 to 8; pigment mixtures containing such compounds; process for the stabilisation of phthalocyanine pigments which comprises incorporating therein at least one compound of Formula I; and paints, lacquers, enamels, inks and plastic materials coloured by means of a phthalocyanine pigment mixture containing a compound of Formula I.

---

The invention relates to phthalocyanine compounds and to phthalocyanine pigment which are stable towards crystallisation.

It is known that the α form of copper phthalocyanine has the drawback of crystallising. The crystallisation or growth of the crystals takes place slowly in the cold and rapidly in the hot on contact with aromatic hydrocarbons. For example, in a paint kept in a can and containing such solvents, the micro-crystals of the pigment are slowly changed into larger crystals with a considerable loss of colouring power. This phenomenon constitutes an objection against the use of this substance in inks, paints and plastics. The crystallisation of the α form represents a change into the more stable β form. The reduction of the colouring power is due to the relatively large dimensions of the slowly developed crystals of β form. In addition, since the β form is greener than the α form an alteration of shade is observed at the same time.

With the object of making the α form of copper phthalocyanine non-crystallising, it has been proposed to stabilise it by mixing it with another metallic phthalocyanine or by coating the particles with colourless protecting substances. This coating, however, involves a reduction of the colouring power.

It has now been found that the crystallisation can be prevented by mixing the phthalocyanines with a compound of the general formula:

$$Pc\text{-}[CH_2\text{--}X\text{--}A]_n \qquad (I)$$

in which Pc represents the residue of a phthalocyanine, X represents an oxygen or sulphur atom, A represents an aryl (preferably phenyl) radical which is unsubstituted or substituted by at least one alkyl group having up to 6 carbon atoms and $n$ represents a whole number from 1 to 8, preferably 3 or 4.

The phthalocyanine of residue Pc may or may not be metallised. The phthalocyanine of residue Pc may be copper phthalocyanine in its α or β form or a halogenated derivative thereof especially a chlorinated derivative containing up to 4% of chlorine.

The alkyl groups possibly substituting the aryl residue A preferably contain 1 to 4 carbon atoms.

The compounds of Formula I may be prepared by reacting a chloromethylated derivative of phthalocyanine with a compound of the formula:

$$HX\text{--}A \qquad (II)$$

in which X and A are as defined above, using at least the same number of moles of the compound of Formula II as the number of chloromethyl groups. The chloromethylated derivatives of phthalocyanine may be obtained by known processes, for example by condensation of a phthalocyanine with symmetrical dichlorodimethyl ether or with paraformaldehyde in the presence of aluminium chloride or chlorosulphonic acid. The known processes for halomethylation usually give mixtures of halomethylated derivatives and these mixtures are suitable for the preparation of the compounds of Formula I. The reaction is preferably effected in the presence of an alkaline agent, such as sodium hydroxide or sodium carbonate, and it may be carried out at temperatures between 50° and 150° C. either in an excess of the compound of Formula II or in a solvent. Having regard to the above-defined reaction conditions, polar solvents such as isopropanol or ethyl Cellosolve may be suitable; only the compound of Formula II reacts. "Cellosolve is a trademark").

The pigment mixtures of the present invention may be advantageously prepared by incorporotion. The incorporation of the compounds of Formula I into the phthalocyanines to be stabilised may be effected in several ways.

For example, the compound of Formula I and the phthalocyanine to be stabilised may be ground together in the dry state, preferably with a grinding aid such as sodium sulphate.

The compound of Formula I and the phthalocyanine to be stabilised may be introduced together into a solvent such as sulphuric acid and precipitated by introduction of the solution into water while preventing too great a rise in the temperature. After precipitation, the pigment mixture is filtered off, washed and dried.

The derivative of Formula I and the phthalocyanine pigment to be stabilised may also be simply admixed in the dry state by stirring without any grinding action.

The phthalocyanine pigment mixtures of the present invention preferably contain 1 to 20% of the compound of Formula I, based on the total weight of the mixture.

The phthalocyanine pigment mixtures may also be prepared by attaching chloromethyl groups to the phthalocyanine to be stabilised by means of a partial chloromethylation, and then reacting a compound of Formula II with the partially chloromethylated phthalocyanine.

The compounds of Formula I, which are soluble in aromatic solvents, have the property of not being leached out in the solvents when they form part of pigment compositions.

The phthalocyanine pigment mixtures of the present invention are particularly good as colouring materials for paints, lacquers, enamels, printing inks, and plastic materials, since they are rapidly dispersed in the non-aqueous media and offer a strong resistance to the growth of crystals.

The following examples, in which the parts are parts by weight, illustrate the invention without restricting it.

EXAMPLE 1

40 parts of copper phthalocyanine (Colour Index 74,160) are dissolved in 200 parts of chlorosulphonic acid and 100 parts of 96% sulphuric acid. 80 parts of paraformaldehyde are added and the mixture is heated for 2 hours at about 90 to 95% C. It is cooled to the ambient temperature and poured on a mixture of water and ice. The precipitate is filtered off, washed until the washings are neutral and dried at about 45° C. 45 parts of tris-(chloromethyl)-copper phthalocyanine are obtained.

*Analysis.*—Calculated for $C_{32}H_{13}N_8Cu(CH_2Cl)_3$ (percent): Cl, 14.80. Found (percent): Cl, 14.55.

5 parts of caustic soda are added to 80 parts of phenol and the mixture is heated until complete solution has taken place. Then 14 parts of tris-(chloromethyl)-copper phthalocyanine are added with stirring and the mixture is heated at 120 to 125° C. for about 4 hours. The resulting is allowed to cool to 80° C. and the product of the reaction is precipitated by addition of alcohol, filtered off, washed with alcohol, then with water until the washings are neutral, and dried. 17 parts of tris-(phenoxymethyl)-copper phthalocyanine free from chlorine are thus obtained in the form of a blue powder.

When the phenol is replaced by meta-cresol, para-amylphenol or xylenols, tris-(3'-methyl-phenoxymethyl)-copper phthalocyanine, tris-(4'-amyl-phenoxymethyl)-copper phthalocyanine and tris-(dimethyl-phenoxymethyl)-copper phthalocyanine respectively are obtained.

EXAMPLE 2

16 parts of 2,3,5-trimethyl-phenol and 6 parts of caustic soda are added to 140 parts of glycol monoethyl ether, and the mixture is heated with stirring until complete solution is obtained. 14 parts of tris-(chloromethyl)-copper phthalocyanine are introduced and the mixture is heated under reflux for eight hours, allowed to cool to 80° C. and diluted with alcohol. The precipitate is filtered off, washed with alcohol and with water until the washings are neutral. 18 parts of a blue powder are obtained, the greater part of which consists of tris-(2,3,5-trimethyl-phenoxymethyl)-copper phthalocyanine which does not contain chlorine.

EXAMPLE 3

10 parts of thiophenol, 10 parts of sodium carbonate and 14 parts of tris-(chloromethyl)-copper phthalocyanine are added to 150 parts of isopropyl alcohol. The mixture is heated at the boil with vigorous stirring for 10 hours, then left to cool and filtered. The resulting solid is washed with alcohol in order to remove excess of thiophenol, then with water until the washings are neutral. 16.8 parts of tris-(phenylthiomethyl)-copper phthalocyanine are obtained.

*Analysis.*—Calculated (percent): S, 10.2. Found (percent): S, 9.5.

EXAMPLE 4

95 parts of the α form of copper phthalocyanine pigment free from chlorine are intimately mixed with 5 parts of tris-(phenyl-thiomethyl)-copper phthalocyanine for 24 hours in a vessel placed in a shaking apparatus. The mixture obtained is very stable in solvents. The stability towards crystallisation is checked as follows:

1 g. of pigment mixture is suspended in 100 ml. of xylene. This is heated for 2 hours under reflux, cooled, filtered off and washed with ethanol.

This mixture, treated in xylene, is incorporated in a paint. Compared with the untreated pigment it does not show any variation of shade and yield. The α form of the copper phthalocyanine pigment (in the pure state) recrystallises completely in the boiling xylene in the form of large needles of the β form when the phenylthiomethyl derivative is not present. When incorporated in a paint and applied comparatively to the pigment not treated with xylene, they show a distinctly inferior yield.

EXAMPLE 5

100 parts of the α form of copper phthalocyanine free from chlorine, obtained by solution in sulphuric acid and reprecipitation from water, are suspended in 1000 parts of water. 5 parts of tris-(2,3,5-trimethyl-phenoxymethyl)-copper phthalocyanine are added to this suspension, and it is stirred for 2 hours at 60° C. The resulting solid is filtered off, drained and dried. Under the conditions of the test described in Example 4, the pigment mixture obtained is found to be stable to recrystallisation in xylene.

EXAMPLE 6

If the tris-(2,3,5-trimethyl-phenoxymethyl)-copper phthalocyanine in Example 5 is replaced by tris-(4-tert.-butyl-phenoxymethyl)-copper phthalocyanine, a pigment composition stable to recrystallisation in the xylene is obtained.

EXAMPLE 7

20 parts of a pigment of the β form of copper phthalocyanine with 0.5 parts of tris-(2,3-dimethylphenoxymethyl)-copper phthalocyanine are suspended in 100 parts of xylene. The mixture is stirred for 2 hours under reflux, then the solvent is entrained in steam. A pigment of a greenish blue shade is obtained.

EXAMPLE 8

22.5 parts of chlorinated copper phthalocyanine having a chlorine content of 3%, 2.5 parts of tris-(phenylthiomethyl)-copper phthalocyanine are dissolved in 250 parts of 98% sulphuric acid. The solution is stirred for 2 hours at 20° C. and is then run into a mixture of ice and water. The pigment mixture is drained and dried. A pigment which does not recrystallise under the test conditions of Example 4 is obtained. Its resistance to sedimentation has been verified in the following test:

A part of the pigment mixture is dispersed in 100 parts of nitrocellulose varnish. 10 parts of this dispersion are mixed with 25 parts of white paint containing a pigment based on titanium oxide. The coloured suspension undergoes no reduction in intensity of colour after storing for 3 days, although the chlorinated copper phthalocyanine, in the pure state, without the thiomethyl derivative, gives under the same conditions of application a suspension which decolourises very rapidly.

EXAMPLE 9

225 parts of copper phthalocyanine (obtained by synthesis from phthalic anhydride, urea and copper chloride), 25 parts of tris-(phenylthiomethyl)-copper phthalocyanine and 1000 parts of a water-soluble mineral salt such as sodium or ammonium sulphate are ground in a ball mill for about 40 hours. This mixture is diluted in 10,000 parts of hot water and filtered. The residue is washed with water to remove the salt and then dried.

A phthalocyanine pigment in the α form is obtained, which is stable towards recrystallisation under the conditions described in Example 4.

EXAMPLE 10

If in the procedure of Example 9 a chlorinated copper phthalocyanine containing about 3% of chlorine is used, a pigment mixture is obtained which does not recrystallise. The resistance to sedimentation of this pigment mixture (under the test conditions of Example 8) is positive after 15 days, although with the chlorinated phthalocyanine alone, a separation of the pigments is found after 2 days.

EXAMPLE 11

240 parts of copper phthalocyanine free from chlorine are ground in a ball mill with 10 parts of tris-(phenoxymethyl)-phthalocyanine, 1000 parts of calcium chloride and 25 parts of trichloroethylene.

After grinding for 48 hours, the mass is taken up in hot water, filtered off and washed until the salt is completely eliminated, and dried.

A pigment of the β form is obtained which does not recrystallise under the conditions of Example 4. Its resistance to flocculation, verified according to the conditions of the standard ASTM 963–65, is positive, although under the same conditions the β phthalocyanine shows a considerable variation in colouration.

EXAMPLE 12

22.5 parts of the β form of copper phthalocyanine and 2.5 parts of tris-(chloromethyl)-copper phthalocyanine are dissolved in 250 parts of 98% sulphuric acid. The solution is stirred for 2 hours at 20° C. and then run onto a mixture of water and ice. The pigment is filtered off, washed with water and drained. The paste obtained is heated for several hours in an alkaline solution of phenol. It is then drained, washed with water and dried. A pigment mixture is obtained which is also resistant to sedimentation (in the test described in Example 8) after 15 days storage, although under the same conditions the phthalocyanine base alone gives rise to separation at the end of 2 days.

EXAMPLE 13

60 parts of sodium hydroxide are dissolved in 50 parts of methyl alcohol, 70 parts of 2,3,5-trimethylphenol is added and progressively heated at 120–125° C. to distillate the alcohol and the water formed during the reaction. Then 15.5 parts of tetra (chloromethyl) copper phthalocyanine (19% chlorine content) is added and heated whilst being stirred at 120–125° C. for about 6 hours. It is left to cool to 80–85° C., diluted with 100 parts of methyl alcohol, filtered, washed with some alcohol to eliminate the excess of trimethyl-phenol, then with water so as to become neutral and dried. 19 parts of a blue powder are obtained, this powder being free of chlorine and mainly comprising tetra (2,3,5-trimethyl-phenoxymethyl) copper phthalocyanine.

EXAMPLE 14

97.5 parts of a copper phthalocyanine pigment (β form), which is obtained by the known processes, is well mixed for ten hours with 2.5 parts of tris (2,3,5-trimethyl-phenoxymethyl) copper phthalocyanine. The pigmentary composition which is obtained is very stable in boiling xylene, and has excellent thermal stability in plastics materials.

In addition, the rheological properties of the inks for helio-engraving which are prepared from the above pigmentary mixture are clearly superior to those of the inks prepared from non-treated pigment. This fact is shown by the following test:

30 parts of pigment, 45 parts of toluene and 225 parts of a white ink comprising 47% of calcium colophonate, 8% of formal-phenol resin and 45% of toluene is ground for 2 hours in a laboratory attritor. The pigmented inks are left to rest for 24 hours, 14 days and 30 days in a thermostatic bath at 20° C. and their viscosity is measured with the aid of a Brookfield viscometer. The results are shown in the following table:

| | Viscosities in poises, after— | | |
|---|---|---|---|
| | 24 hours | 14 days | 30 days |
| Non-treated pigment | 4.50 | 6.00 | 6.80 |
| Treated pigment | 1.70 | 2.80 | 2.80 |

We claim:

1. A phthalocyanine pigment mixture which contains a compound of the formula:

$$Pc[CH_2-X-A]_n \quad (I)$$

in which Pc represents a phthalocyanine residue, X represents an oxygen or sulphur atom, A represents an aryl radical which is unsubstituted or substituted by at least one alkyl group having up to 6 carbon atoms and $n$ represents a whole number from 1 to 8.

2. A phthalocyanine pigment mixture as claimed in claim 1 wherein $n$ is 3 or 4 in Formula I.

3. A mixture as claimed in claim 1 wherein there is 1 to 20% by weight, based on the mixture of the compound of Formula I as defined in claim 1.

4. A mixture comprising 100 parts of copper phthalocyanine in α form and 5 parts of tris-(2,3,5-trimethylphenoxymethyl) copper phthalocyanine.

5. A mixture comprising 97.5% of copper phthalocyanine in β form and 2.5% of tris-(2,3,5-trimethylphenoxymethyl) copper phthalocyanine.

6. A process for the stabilisation of the phthalocyanine pigments which comprises incorporating therein at least one compound of the formula:

$$Pc[CH_2-X-A]_n \quad (I)$$

in which Pc represents a phthalocyanine residue, X represents an oxygen or sulphur atom, A represents an aryl radical which is unsubstituted or substituted by at least one alkyl group having up to 6 carbon atoms and $n$ represents a whole number from 4 to 8.

References Cited

UNITED STATES PATENTS 3,646,003   2/1972   Lamure _____ 106—288 Q

FOREIGN PATENTS 758,485   5/1967   Canada _____ 106—288 Q
949,739   2/1964   Great Britain _____ 106—288 Q DELBET E. GANTZ, Primary Examiner J. W. HELLWEGE, Assistant Examiner U.S. Cl. X.R.

260—314.5